UNITED STATES PATENT OFFICE.

ROYALL O. E. DAVIS AND HARRY BRYAN, OF WASHINGTON, DISTRICT OF COLUMBIA.

PROCESS FOR THE RECOVERY OF AMMONIA.

1,319,663.

No Drawing.

Specification of Letters Patent.    Patented Oct. 21, 1919.

Application filed May 15, 1919.   Serial No. 297,414.

(FILED UNDER THE ACT OF MARCH 3, 1883, 22 STAT. L., 625.)

*To all whom it may concern:*

Be it known that we, ROYALL O. E. DAVIS and HARRY BRYAN, citizen of the United States and employees of the Department of Agriculture of the United States of America, residing in the District of Columbia, whose post-office address is Washington, D. C., have invented a new and useful Process for the Recovery of Ammonia.

This application is made under Act of March 3, 1883, Chapter 143 (22 Stat., 625) and the invention herein described and claimed may be used by the Government of the United States or any of its officers or employees in the prosecution of work for the Government, and by any person in the United States without payment to us of any royalty thereon.

Our invention relates to the production of ammonia by passing a mixture of gaseous hydrogen and nitrogen either mixed or alternately over a catalytic agent and removing the ammonia formed by absorption in a solid or liquid from which the ammonia may be later evolved by subjecting to heat or reduced pressure and collected in the manner desired. By a well known process, removal of ammonia is accomplished by the production of a low temperature in the circulating gases whereby the ammonia is partially liquefied. In our method the ammonia is completely absorbed at ordinary temperatures, and is recovered either by heating the absorbent in any desired manner or subjecting it to vacuum when the ammonia will be evolved and may be collected by cooling, as anhydrous ammonia, or by acid or may be used as gaseous ammonia for oxidation or other chemical reactions. The process may be made continuous by use of two or more chambers of absorbent materials, which may be used alternately for absorption and liberation of ammonia either under increased pressure, at ordinary pressure, or under vacuum.

We have found charcoal to be a valuable agent for the absorption of ammonia in the manner described but other substances or mixtures of other substances capable of absorbing ammonia may be employed. We do not wish to limit the application of our process to the use of charcoal alone as an absorbent, but mean to imply the use of other solids or liquids which will readily and completely absorb ammonia and from which the ammonia may be readily separated by the application of heat or vacuum. Certain chemicals as for instance calcium chlorid, ammonium nitrate, etc., show the property of absorbing ammonia and all such are included in this claim. Furthermore, liquids, for instance, water, may be used for the same purpose, and the ammonia later volatilized and collected by cooling.

What we claim is:

1. The process of recovering ammonia formed by passing a mixture of gaseous hydrogen and nitrogen over a catalytic agent, consisting in the absorption at ordinary temperatures of said ammonia in charcoal, and in then liberating the said ammonia from the charcoal by the application of a vacuum thereto, and in subsequently collecting said ammonia by cooling.

2. The process of recovering ammonia formed by passing a mixture of gaseous hydrogen and nitrogen over a catalytic agent, consisting in the absorption at ordinary temperatures of said ammonia in charcoal, and in then liberating said ammonia from the charcoal by the application of a vacuum thereto, and in subsequently collecting said ammonia by the use of an acid.

In testimony whereof we affix our signatures in the presence of two subscribing witnesses.

ROYALL O. E. DAVIS.
HARRY BRYAN.

Witnesses:
J. P. SCHROEDER,
A. G. RICE.